(12) United States Patent
Kitamura et al.

(10) Patent No.: US 11,090,756 B2
(45) Date of Patent: Aug. 17, 2021

(54) JOINING METHOD

(71) Applicant: G-TEKT CORPORATION, Saitama (JP)

(72) Inventors: Yoshikazu Kitamura, Tokyo (JP); Hiroshi Nishimura, Koka (JP); Yasushi Suzuki, Tokyo (JP)

(73) Assignee: G-TEKT CORPORATION, Saitama (JP)

( * ) Notice: Subject to any disclaimer, the term of this patent is extended or adjusted under 35 U.S.C. 154(b) by 216 days.

(21) Appl. No.: 16/169,950

(22) Filed: Oct. 24, 2018

(65) Prior Publication Data

US 2020/0130097 A1  Apr. 30, 2020

(51) Int. Cl.
*B23K 11/10* (2006.01)
*B23K 11/11* (2006.01)
(Continued)

(52) U.S. Cl.
CPC ........... *B23K 11/115* (2013.01); *B21J 15/025* (2013.01); *B23K 11/0066* (2013.01);
(Continued)

(58) Field of Classification Search
CPC .......... B23K 11/0066; B23K 2101/006; B23K 2101/16; B23K 2101/38; B23K 2103/10; B23K 2103/12; B23K 2103/15; B23K 2103/18; B23K 2103/20; B23K 2103/004; B23K 2103/0046; B23K 2103/0053; B23K 2103/0066; B23K 2103/11; B23K 2103/115; B23K 2103/185; B23K 2103/28; B23K 2103/3009; B23K 2103/34; B29C 65/02; B29C 65/74; B21J 15/025
(Continued)

(56) References Cited

U.S. PATENT DOCUMENTS

2015/0001189 A1  1/2015  Spinella et al.
2015/0144602 A1  5/2015  Draht et al.
(Continued)

FOREIGN PATENT DOCUMENTS

JP  07-214338 A  *  8/1995
JP  07-214338 A     8/1995
(Continued)

OTHER PUBLICATIONS

Office Action received for Japanese Patent Application No. 2016-200670, dated Apr. 18, 2019, 13 pages (8 pages of English Translation and 5 pages of Office Action).
(Continued)

*Primary Examiner* — Hung D Nguyen
(74) *Attorney, Agent, or Firm* — Womble Bond Dickinson (US) LLP

(57) ABSTRACT

An aluminum plate (103) is overlaid on a steel plate (102). A distal end (113) of a button component (101) is pushed in from the obverse surface side of the aluminum plate (103), and the distal end (113) is abutted against the steel plate (102) by applying a first pressure to the button component (101) made of steel without heating. The distal end (113) of the button component (101) and the steel plate (102) are welded by resistance spot welding while applying a second pressure lower than the first pressure to the button component (101).

8 Claims, 4 Drawing Sheets

(51) Int. Cl.
   *B23K 11/00* (2006.01)
   *B23K 11/20* (2006.01)
   *B21J 15/02* (2006.01)
   *B23K 103/20* (2006.01)
   *B23K 101/00* (2006.01)

(52) U.S. Cl.
   CPC ........ *B23K 11/20* (2013.01); *B23K 2101/006* (2018.08); *B23K 2103/20* (2018.08)

(58) Field of Classification Search
   USPC ............. 219/91.2, 76.17, 78.01, 86.1, 89.22, 219/86.23, 86.51, 86.61, 90
   See application file for complete search history.

(56) References Cited

U.S. PATENT DOCUMENTS

| | | | |
|---|---|---|---|
| 2015/0217395 A1* | 8/2015 | Spinella | F16B 37/061 219/86.22 |
| 2016/0067913 A1 | 3/2016 | Draht et al. | |
| 2016/0084288 A1 | 3/2016 | Chung et al. | |
| 2016/0167158 A1 | 6/2016 | Spinella et al. | |
| 2020/0124069 A1* | 4/2020 | Yamauchi | B23K 11/20 |

FOREIGN PATENT DOCUMENTS

| | | | |
|---|---|---|---|
| JP | 07-236979 A | | 9/1995 |
| JP | 08-033987 A | | 2/1996 |
| JP | 2014-000580 A | | 1/2014 |
| JP | 2015-062911 A | | 4/2015 |
| JP | 2016-528044 A | | 9/2016 |
| JP | 2017087281 A | * | 5/2017 |
| JP | 2018-500184 A | | 1/2018 |

OTHER PUBLICATIONS

Office Action received for Japanese Patent Application No. 2016-200670, dated Nov. 12, 2019, 8 pages (4 pages of English Translation and 4 pages of Office Action).

Office Action received for Japanese Patent Application No. 2016-200670, dated May 7, 2019, 6 pages (3 pages of English Translation and 3 pages of Office Action).

Office Action received for Japanese Patent Application No. 2016-200670, dated Jul. 14, 2020, 11 pages (5 pages of English Translation and 6 pages of Office Action).

Office Action received for Japanese Patent Application No. 2020-021368, dated Feb. 2, 2021, 8 pages (4 pages of English Translation and 4 pages of Office Action).

Notice of Reasons of Refusal for Japanese Applications No. 2020-151826 dated Jul. 6, 2021 (3 pages of English translation and 3 pages of original document).

* cited by examiner

JOINING METHOD

BACKGROUND OF THE INVENTION

The present invention relates to a joined structure method of joining a structure made of a different type of material to a structure made of a steel material.

A component (vehicle body component) that constitutes a vehicle is required to have a high strength. In addition, the component is also required to be lightweight in recent years. For this reason, for example, high tensile steel or an aluminum material is used as the material that forms the component. In addition, a composite material that integrates the high tensile steel and the aluminum material is used.

When joining members of the steel material, for example, spot welding or the like is used. When joining a different type of material as described above, for example, the shaft portion of a rivet is pushed in an aluminum plate without a hole so as to extend through, and the distal end of the shaft portion and a steel plate are welded. Alternatively, an opening is formed in advance in an aluminum plate, the shaft portion of a rivet is fitted in the opening, and the distal end of the shaft portion and a steel plate are welded (see Japanese Patent Laid-Open No. 2015-062911).

However, these techniques cannot meet the current requirement of higher joining strength. For the above-described joining of a different type of material, an appropriate technique does not exist, including the manufacturing cost and a strength to be obtained.

SUMMARY OF THE INVENTION

It is an object of the present invention to provide a joining method to join a structure made of a different type of metal material to a structure made of a steel material with a higher strength without increasing the cost.

In order to achieve the above object of the present invention, there is provided a joining method comprising: overlaying, on a first component made of a steel material, a second component made of a material different from the steel material; pushing a tapered distal end of a button component in the second component from an obverse surface side of the second component and abutting the distal end against the first component by applying a first pressure to the button component without heating, the button component including a head portion and a shaft portion, the shaft portion including one end connected to the head portion, and the other end that forms the distal end, and the button component being made of steel including a cross section being parallel to an axial direction and in a substantially T shape; and welding the distal end of the button component and the first component by resistance spot welding while applying a second pressure lower than the first pressure to the button component in a state in which the distal end abuts against the first component.

DESCRIPTION OF THE PREFERRED EMBODIMENT

Figure 1:
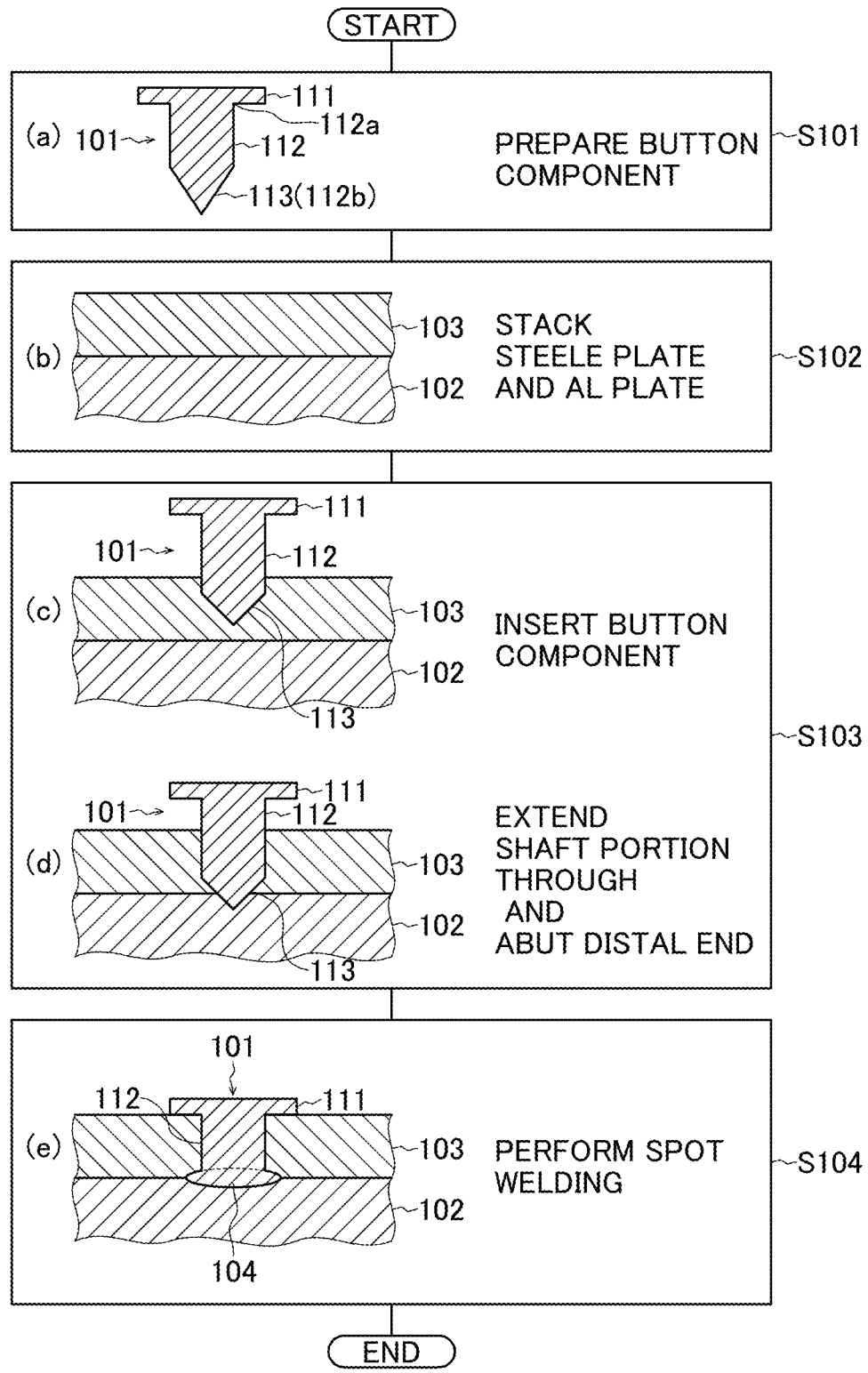
FIG. 1 is a view for explaining a joining method according to the embodiment of the present invention.

The embodiment of the present invention will now be described with reference to the accompanying drawings. FIG. 1 is a view for explaining a joining method according to the embodiment of the present invention.

In first step S101, a button component 101 shown in (a) of FIG. 1 is prepared. The button component 101 includes a head portion 111 and a shaft portion 112. The shaft portion 112 includes one end 112a connected to the head portion 111, and the other end 112b that forms a tapered distal end 113 of the button component 101. The button component 101 is made of, for example, steel such as carbon steel for cold heading. A cross section of the button component 101 parallel to the axial direction has an almost T shape. Each of the head portion 111 and the shaft portion 112 has, for example, a circular shape on a planar view. The diameter of the shaft portion 112 is, for example, 10 mm. Note that the shape of each of the head portion 111 and the shaft portion 112 on a planar view (the shape of a cross section perpendicular to the axial direction) is not limited to the circular shape and may be a polygonal shape. In addition, the shape of the head portion 111 on a planar view is not limited to a convex polygonal shape and may be, for example, a concave polygonal shape, that is, a shape that is partially recessed in the direction of the shaft portion 112.

Next, in second step S102, as shown in (b) of FIG. 1, an aluminum plate (second component) 103 made of a material different from a steel material is overlaid on a steel plate (first component) 102 made of a steel material. The steel plate 102 is, for example, a high tensile steel plate such as JSC780 or JSC980Y. The thickness of the steel plate 102 is, for example, 1 mm. The aluminum plate 103 is, for example, an aluminum alloy plate such as an AL5052P material. The thickness of the aluminum plate 103 is, for example, 1 mm. Note that the shaft portion 112 of the button component 101 need only be longer than the thickness of the aluminum plate 103.

Next, in third step S103, as shown in (c) of FIG. 1, the distal end 113 of the button component 101 is inserted and pushed in the aluminum plate 103 from the obverse surface side of the aluminum plate 103. Next, as shown in (d) of FIG. 1, the distal end 113 of the button component 101 is extended through the aluminum plate 103 and abutted against the steel plate 102. Here, a first pressure is applied to the button component 101 to push the distal end 113 of the button component 101 in the aluminum plate 103 from the obverse surface side of the aluminum plate 103 and abut the distal end 113 against the steel plate 102.

Figure 2:
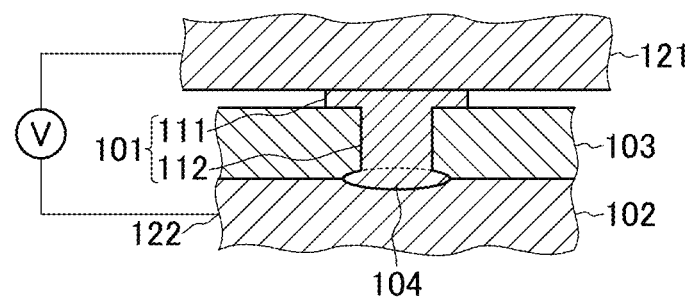
FIG. 2 is a view for explaining the fourth step in the joining method according to the embodiment of the present invention.

Next, in fourth step S104, the distal end 113 and the steel plate 102 are welded by well-known resistance spot welding. After the distal end 113 of the button component 101 is abutted against the steel plate 102, as shown in FIG. 2, one electrode 121 of a welder V is abutted against the head portion 111 of the button component 101, and another electrode 122 of a welder V is electrically connected to the steel plate 102. Then, a welding current is supplied between the two electrodes 121 and 122 to start spot welding, and the one electrode 121 abutted against the head portion 111 is pressed by a second pressure towards the steel plate 102 to further push the shaft portion 112 in the aluminum plate 103. In other words, in a state in which the distal end 113 of the button component 101 abuts against the steel plate 102, the distal end 113 and the steel plate 102 are welded by resistance spot welding while applying the second pressure to the button component 101. The second pressure is a well-known general welding pressurizing force.

By the welding, a nugget 104 is formed between the distal end 113 and the steel plate 102 by a molten and solidified body thereof. By the welding, the shape of the distal end 113 changes from the tapered shape. In the fourth step, when the welding is completed, the bearing surface of the head portion 111 abuts against the obverse surface of the aluminum plate 103, as shown in (e) of FIG. 1.

In the spot welding, the second pressure (welding pressurizing force) serving as a press force is 100 to 300 kgf·cm$^2$, and the welding current is 1,000 to 14,000 A and has 1 to 30 cycles. Note that 1 kgf/cm$^2$=98066.5 Pa.

Here, in the third step, it is important to push the button component 101 in without heating and by setting the first pressure applied to the button component 101 to a pressure higher than the second pressure in the fourth step (first pressure>second pressure). For example, as described above, when the button component 101 is pushed in while abutting the one electrode 121 against the head portion 111 of the button component 101 in the resistance spot welding, the energization current is made lower than in the welding state, or energization is not performed to obtain a state in which the button component 101 is not heated.

For example, in a case of an AL5052P material having a plate thickness of 1 mm, the first pressure is set to 400 kgf·cm$^2$ or more. This makes it possible to insert and push the distal end 113 of the button component 101 into the aluminum plate 103 without heating to extend through the aluminum plate 103 and abut the distal end 113 against the steel plate 102. In addition, in a case in which the steel plate 102 and the aluminum plate 103 near the inserted portion of the button component 101 are pressurized and fixed by a clamp or the like, when the first pressure is set to 550 kgf·cm$^2$ or more, the distal end 113 of the button component 101 extends through the aluminum plate 103 without heating, as described above. The first pressure is set appropriately such that the shaft portion (distal end) of the button component can extend through the first component.

With the above-described process, a joined structure formed from the steel plate 102, the aluminum plate 103 overlaid in the steel plate 102, and the button component 101 made of steel having an almost T-shaped cross section in the axial direction is obtained. The shaft portion 112 of the button component 101 extends through the aluminum plate 103 from the obverse surface side, the distal end 113 of the button component 101 is welded to the steel plate 102, and the bearing surface of the head portion 111 of the button component 101 abuts against the obverse surface of the aluminum plate 103.

In this joined structure, the aluminum plate 103 is pressed against the steel plate 102 by the head portion 111 of the button component 101 firmly welded to the steel plate 102 by the nugget 104. The nugget 104 serving as a welding portion is a molten and solidified portion of the steel plate 102 and the button component 101 (distal end 113) which are made of the same type of material, and a high joining strength is obtained. As a result, the structure made of a different type of metal material such as an aluminum material can be joined to the structure made of a steel material with a higher strength. In addition, since the button component 101 that can be manufactured inexpensively is used, and welding is performed by the existing resistance spot welding technology, the cost does not increase.

Note that in third step S103 described above, a dedicated pressing member is used to push the button component 101 in the aluminum plate 103 and abut the distal end 113 against the steel plate 102. However, the one electrode 121 used in the resistance spot welding in the fourth step may be used as the pressing member. In this case, in the third step, the one electrode 121 is abutted against the head portion 111 of the button component 101 and pressed towards the steel plate 102, thereby inserting and pushing the distal end 113 of the button component 101 in the aluminum plate 103, extending the distal end 113 through the aluminum plate 103, and abutting the distal end 113 against the steel plate 102.

Figure 3:
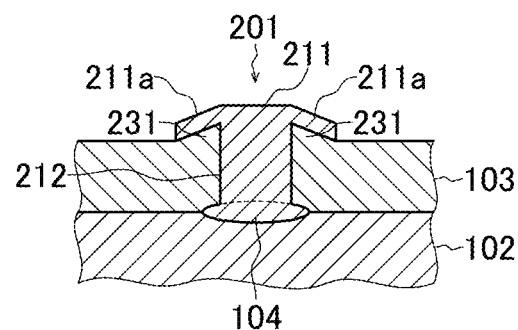
FIG. 3 is a sectional view showing an example of a joined structure by the joining method according to the embodiment of the present invention.

The aluminum plate 103 may be fixed to the steel plate 102 using a button component 201 shown in FIG. 3 in place of the button component 101 shown in FIG. 1. An eaves portion 211a of a head portion 211 of the button component 201 has such a shape that its peripheral portion is close to the distal end side of a shaft portion 212. With this shape, a groove region 231 is formed on the bearing surface of the head portion 211. When the shaft portion 212 is inserted and pushed in the aluminum plate 103, and spot welding is performed, the aluminum plate 103 on the periphery of the shaft portion 212 may melt, and the molten aluminum may scatter to the periphery. When the eaves portion 211a with the above-described structure is formed, the molten aluminum (a material formed as the second component melts) can be stored in the groove region 231 formed on the side (lower side) of the shaft portion 212 in the eaves portion 211a, and scattering of the molten aluminum can be prevented.

Figure 4:
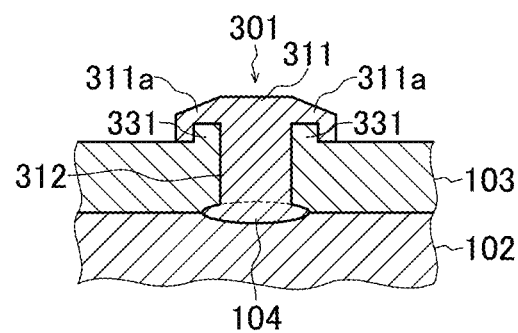
FIG. 4 is a sectional view showing another example of the joined structure by the joining method according to the embodiment of the present invention.

In addition, the aluminum plate 103 may be fixed to the steel plate 102 by a button component 301 shown in FIG. 4. An eaves portion 311a of a head portion 311 of the button component 301 also has such a shape that its peripheral portion is close to the distal end side of a shaft portion 312. However, the peripheral portion of the eaves portion 311a is directed to the lower side in the axial direction and becomes almost parallel to the shaft portion 312. Even by the eaves portion 311a with the above-described structure, the molten aluminum can be stored in a groove region 331 formed on the lower side of the eaves portion 311a, and scattering of the molten aluminum can be prevented.

Figure 5:
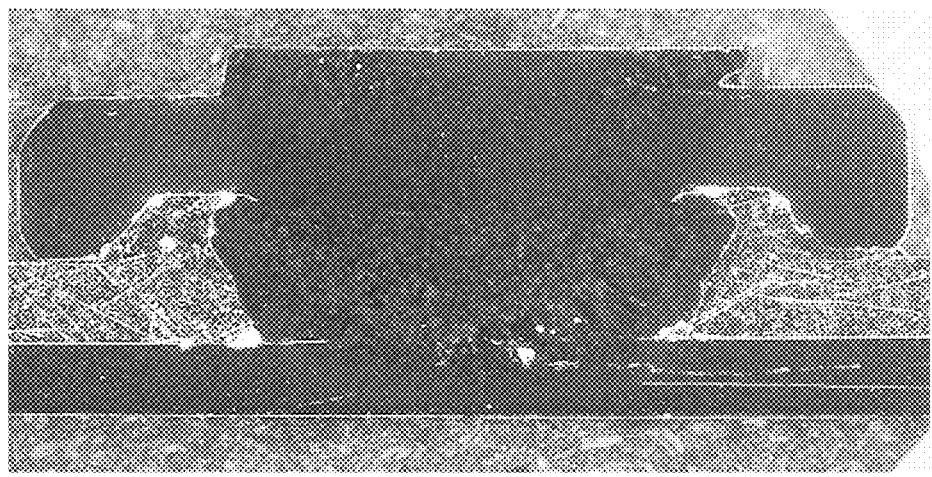
FIG. 5 is a photo obtained by observing a cross section of the joined structure by the joining method according to the embodiment of the present invention with a metallurgical microscope.

A result obtained by observing, with a metallurgical microscope, a cross section of a joined structure in which an aluminum plate is fixed to a steel plate using a button component produced using SWCH (Steel Wire Cold Heading) 12 as a material will be described next with reference to FIG. 5. The button component used has such a shape that the peripheral portion of the eaves portion of the head portion is close to the distal end side of the shaft portion. A JSC980 material with a plate thickness of 0.8 mm was used as the steel plate, and an AL5052P material with a plate thickness of 1 mm was used as the aluminum plate. In addition, the button component was produced using carbon steel for cold heading.

The pressure applied when inserting and pushing the distal end of the button component in the aluminum plate was set to 400 kgf. In addition, the welding pressurizing force applied when welding the steel plate and the distal end of the button component by resistance spot welding was set to 200 kgf. Note that the welding current was set to 10,000 A with 3 cycles (3/50 sec), and the welding was performed by setting a holding time to 10 cycles. The diameter of the nugget was 2.5 mm. It is confirmed that the welding portion is molten and solidified, as shown in FIG. 5.

Figure 6:
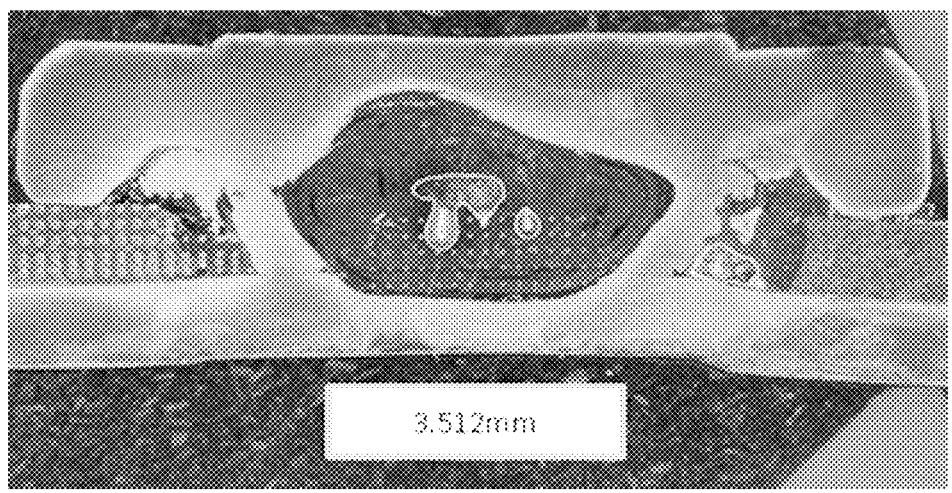
FIG. 6 is a photo obtained by observing a cross section of a joined structure by another joining method with a metallurgical microscope.

On the other hand, FIG. 6 shows a metallurgical micrograph of a cross section in a case in which the pressure and the welding pressurizing force applied when inserting and pushing the distal end of the button component in the aluminum plate were equally set to 200 kgf, and joining was performed using resistance heating by energizing even at the time of pushing. In this case as well, the button component used has such a shape that the peripheral portion of the eaves portion of the head portion is close to the distal end side of the shaft portion. A JSC980 material with a plate thickness of 0.8 mm was used as the steel plate, and an AL5052P material with a plate thickness of 1 mm was used as the aluminum plate. In addition, the button component was produced using carbon steel for cold heading.

In this joining method, a region where the texture changed was confirmed at the center of the button component, as shown in FIG. 6. The texture change region included about 30 wt % of aluminum, and a remarkable decrease in hardness was confirmed. When resistance heating is performed by energizing even at the time of pushing the distal end of the button component in the aluminum plate, the distal end can be inserted even if the pressurizing force is small. In the heated state, however, it is considered that the aluminum of the aluminum plate in contact diffuses inside the button component, a texture change region is formed as described above, and lowering of hardness occurs. Even in a case in which the second component is made of a different type of metal other than aluminum, the same problems probably occur.

As is apparent from the above description, if the button component is heated when pushing the distal end of the button component in the aluminum plate, the distal end can be pushed in and extended through the aluminum plate by a small pressurizing force. However, the strength of the button component lowers, and a high joining strength cannot be obtained, as can be seen.

To the contrary, according to this embodiment since the button component is not heated when pushing the distal end of the button component in the aluminum plate, the strength of the button component does not lower, and a high joining strength can be obtained. In a case in which the button component is pushed in without heating and then welded (the state shown in FIG. 5), aluminum is not detected in the button component, and lowering of the strength is not measured.

As described above, in this embodiment, in an unheated state, the button component is pushed in the second component from the obverse surface side of the second component by the first pressure higher than the second pressure in welding and, after that, the first component and the distal end extending through the second component are welded by resistance spot welding under the second pressure. This makes it possible to join a structure made of a different type of metal material such as an aluminum material to a structure made of a steel material with a higher strength without increasing the cost.

Figure 7:
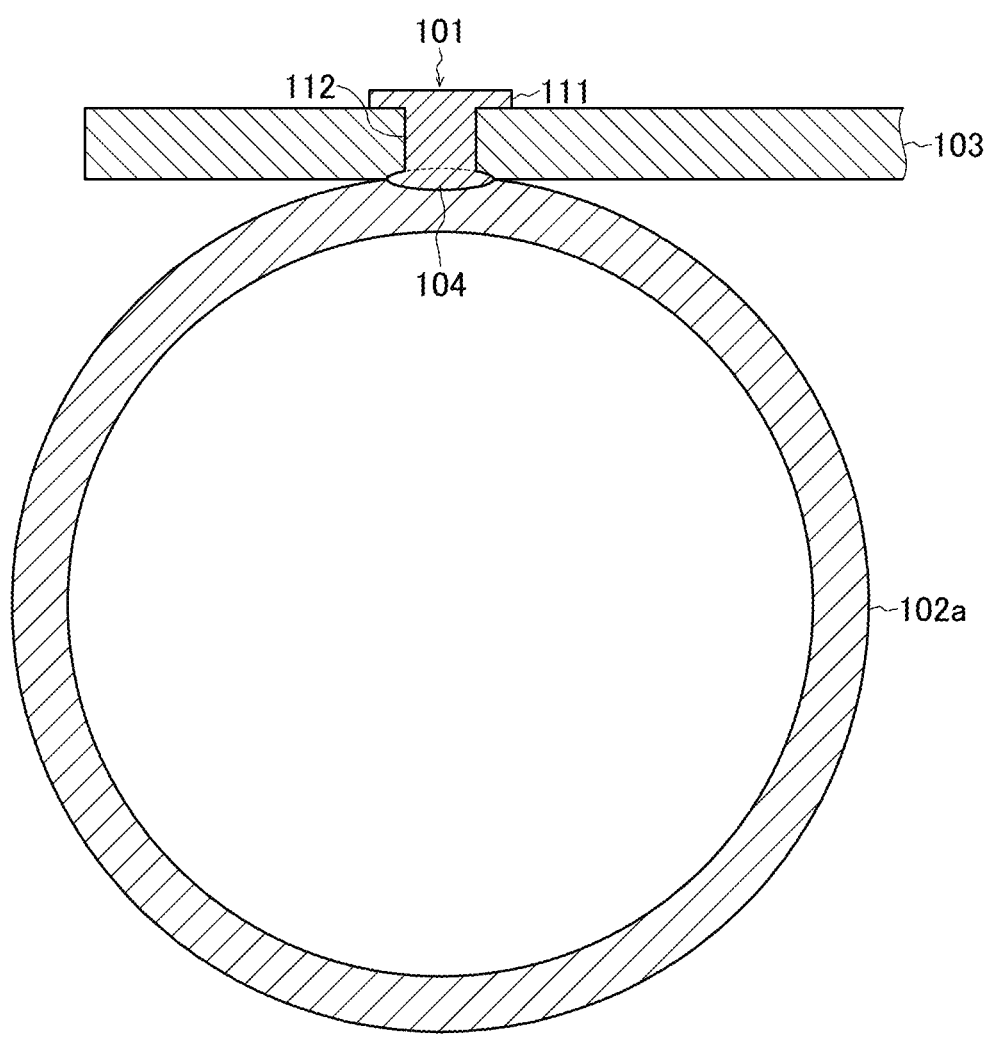
FIG. 7 is a sectional view showing another example of another joined structure by the joining method according to the embodiment of the present invention.

Note that the present invention is not limited to the above-described embodiment, and it is obvious that many modifications and combinations can be made within the technical scope of the present invention by those skilled in the art in this field. For example, the first component and the second component are not limited to plate members and may be structures of another shape. For example, as shown in FIG. 7, the shaft portion 112 of the button component 101 may be extended through the aluminum plate 103, and the shaft portion 112 may be welded to an annular steel material 102a, thereby joining the annular steel material 102a to the aluminum plate 103. In addition, the second component is not limited to the aluminum material and may be a component made of a material different from the steel material within the scope of application of the present invention. Furthermore, the button component is not limited to SWCH12 and need only be made of steel.

What is claimed is:

1. A joining method comprising:
overlaying, on a first component made of a steel material, a second component made of a material different from the steel material;
pushing a tapered distal end of a button component in the second component from an obverse surface side of the second component and abutting the distal end against the first component by applying a first pressure of 400 kgf·cm$^2$ or more to the button component without heating thereby preventing the material of the second component from being diffused inside the button component, the button component including a head portion and a shaft portion, the shaft portion including one end connected to the head portion, and the other end that forms the distal end, and the button component being made of steel including a cross section being parallel to an axial direction and in a substantially T shape; and
welding the distal end of the button component and the first component by resistance spot welding while applying a second pressure of 100 kgf·cm$^2$ to 300 kgf·cm$^2$ lower than the first pressure to the button component in a state in which the distal end abuts against the first component.

2. The method according to claim 1, wherein the pushing includes abutting a bearing surface of the head portion against the obverse surface of the second component.

3. The method according to claim 1, wherein the welding includes, after abutting, starting spot welding and further pushing the shaft portion in the second component.

4. The method according to claim 1, wherein the head portion of the button component includes such a shape that a peripheral portion is close to a distal end side of the shaft portion.

5. The method according to claim 4, wherein the peripheral portion of the head portion is directed to the distal end side of the shaft portion and becomes almost parallel to the shaft portion.

6. The method according to claim 1, wherein the pushing includes abutting one electrode used in the resistance spot welding against the head portion of the button component and pressing the electrode towards the first component.

7. The method according to claim 1, wherein the second component is substantially made of aluminum.

8. The method according to claim 1, wherein the welding includes storing a material formed by melting the second component in a groove region formed on a bearing surface of the head portion of the button component.

* * * * *